FIG. 1

Feb. 2, 1960 E. KATZBERG 2,923,278
LOADING AND EJECTION MECHANISM
Filed Jan. 19, 1955 6 Sheets-Sheet 5

FIG. 5

INVENTOR.
Eugene Katzberg
BY
John J. Sullivan
ATTORNEY.

United States Patent Office 2,923,278
Patented Feb. 2, 1960

2,923,278

LOADING AND EJECTION MECHANISM

Eugene Katzberg, Bayside, N.Y., assignor to Republic Aviation Corporation, near Farmingdale, N.Y., a corporation of Delaware Application January 19, 1955, Serial No. 482,764

14 Claims. (Cl. 121—40)

This invention relates to stores loading and ejection mechanisms generally and more particularly to a power loading and ejection unit for the retention in, and the displacement of a store from, an associated object or body such as an airplane and the operating system therefor. At the same time the present mechanism constitutes a self-contained or packaged unit, capable of unlimited, repeated use without damage or destruction to any of its component parts by reason of the ejection of a store such as tank, bomb, etc.

Moreover, the present invention being power operated in both extension and retraction may be employed not only to eject the associated store from an aircraft but to load the store into the aircraft as well.

The instant invention, among other things, contemplates a power device of the type set forth above which is specially adapted and constructed to mount a store in or on an aircraft so that it may be carried thereby against the action of gravity and when desired may be quickly moved outwardly of the aircraft to the end that it may be disconnected and dropped or jettisoned therefrom. Upon such a disposition of the store the extended or protracted portion of the unit may be withdrawn or retracted to its original position relative to the aircraft where it remains intact for future use.

In addition the invention has in view positive means by which the power unit is normally locked against accidental displacement or movement relative to the aircraft while it is contained therein, said means being releasable only by the intentional act of the pilot. When the unit is thus unlocked and projected from the airplane, additional means is provided automatically operable at a predetermined position of the unit in its extension to cushion or snub it as it approaches the end of its outward travel.

With the above and other objects in view, as will be apparent, this invention consists in the construction, combination and arrangement of parts all as hereinafter more fully described, claimed and illustrated in the accompanying drawings, wherein:

While the subject invention is designed for general application, it has particular utility in aircraft wherever it is desired to eject or jettison a store such as a bomb, fuel tank, etc., in flight.

In present day high speed airplanes, especially the fighter and pursuit type capable of sonic and supersonic speeds, the jettisoning of bombs and expendable equipment therefrom, such as tanks, during even normal flight has become a problem due to the action of aerodynamic forces on and around the aircraft and the store both before and after release. These forces create a condition in the nature of a suction or vacuum tending to hold the store, when released, in dangerous proximity to the aircraft. It has, therefore, become necessary to forcibly propel or eject the expendable equipment or bomb for two reasons: (1) to overcome the tendency of the disconnected body or object to remain with the aircraft which would impair the accuracy with which it might be aimed at a designated target or assigned area, and (2) to drive it outwardly and away from the aircraft a distance sufficient to prevent its falling or tumbling against the aircraft, particularly the aft end or tail portion thereof.

In order to attain the foregoing results the present invention proposes an improved device consisting of a power unit by which the store is carried in or on the aircraft and an operating system by which the store is moved relative to the aircraft both for loading and ejection and by which said power unit is actuated either to move the store in flight to a point remote from the airplane or, conversely, to move the store into the airplane when grounded. To this end a pressurized fluid system is provided which is operatively connected to, so as to become a unitary and integral part of the power unit for the reciprocatory operation thereof to effect movement of the store into and out of the aircraft. In this manner the store may be raised or loaded into the aircraft and the power unit is filled and charged with air or gas under pressure, and locked against operation in this position. When it is desired to eject or jettison the store, the lock mechanism is disengaged and the air or gas under pressure in the power unit effects the protraction thereof whereby the store is moved outwardly of the aircraft a predetermined distance where it may be released. At a predetermined point in the extension of the unit, shock absorbing means are automatically actuated to suppress the outward travel of the unit whereby it is brought to a gradual stop. Upon a separate and distinct second actuation of the same system, pressure is directed to the unit whereby it is forced inwardly of the aircraft or compressed to its original retracted position.

Referring now more particularly to the drawings, the numeral 10 designates the power unit assembly. This assembly consists generally of an outer cylinder 11 fixedly secured to structure of the aircraft in any suitable and well known manner and an inner cylinder 12 telescopically mounted in the outer cylinder for reciprocation relative thereto. To this end the inner cylinder 12 is provided at one of its ends with a peripheral enlargement 13 the outer face of which abuts substantially flush against the inner surface of the outer cylinder 11, the remaining portion of the inner cylinder 12 being of a smaller diameter and disposed in spaced relationship, as at 14, to the inner surface of the outer cylinder 11. An airtight seal, such as for example an O-ring 13', is provided between the bearing surfaces of the outer cylinder 11 and the enlarged end 13 of the inner cylinder 12.

The upper or inner end of the outer cylinder 11 is provided with threads, at 15, for cooperation with an internally threaded cap 16 which overlies and encloses this end of the cylinder 11. Suitable sealing means, such as an O-ring 17 mounted in the conventional manner, is provided between the abutting surfaces of the cap 16 and the cylinder 11 to prevent the escape of fluid between the cylinder and cap. A standard lock ring-nut 15' is employed on the threads 15 of the cylinder 11 to engage the end of the cap 16 to secure it against retrograde movement thereon.

At its opposite or outer end the outer cylinder 11 is constructed in substantially the same way as the upper end, being closed in like manner by a cap 18 generally similar to the cap 16 at the inner end of cylinder 11. The end wall of the cap 18 is pierced by an aperture, as at 19, for the passage of the inner cylinder 12 which terminates beyond the cap 18 regardless of its position in cylinder 11. The end wall of the cap 18 is disposed in spaced relationship relative to the lower or outer end of the cylinder 11 whereby a chamber 20 is created between it and the end of cylinder 11, the inner end of which is in open communication with, and serves as a continuation of, the space 14 between the cylinders 11 and 12.

A sleeve 21, having an enlarged head 21' at its inner end adapted to fill a portion of the chamber 20 with its opposed faces in substantial abutment with the surface of the cylinder 12 and the flange of the cap 18 respectively, is disposed around the tube 12 and free to move longitudinally thereof between the end or base wall of the cap 18 and the outer end of the outer cylinder 11. Each face of the head portion 21' is provided with appropriate sealing means 21" thereby creating a packing or seal to prevent the leakage of fluid between the cap 18 or cylinder 12 and the head 21'. The remainder of the sleeve 21 extends along the cylinder 12 and passes through the aperture 19 in the cap 18 to terminate at a point outwardly of the cap 18.

An integral flange 11' projects laterally from the outer end of the cylinder 12 to abut the outer end of the sleeve 21 when the cylinders are telescoped whereby the head 21' on the opposed end of the sleeve is forced and held at the inner end of the chamber 20 flush against the lower end of the cylinder 11. The purpose and functions of this sleeve 21 will become more apparent as the description of the operation of the unit 10 under the pressure of fluid in the system is subsequently explained.

The outer extremity of the inner cylinder 12 is closed, as at 12', to create a solid body for the attachment of suitable means for the mounting of the bomb or store thereto. One such suitable means may consist of an eyebolt 22 which is threadably secured in the closed extremity 12' of the cylinder 12 and is there locked by a nut 22' to project outwardly of the end of the cylinder.

Adjacent its iner end the cylinder 12 is provided with one or more holes 23 which pierce the cylinder 12 in transverse alignment one with the other, each having its wall tapered inwardly. Each of the holes 23 receives a ball 24 having a diameter substantially greater than the thickness of the wall of the cylinder 12 and adapted to be inserted in its respective hole from the outer side of said cylinder whereby a portion of the ball projects inwardly of the cylinder 12 when the ball is disposed substantially in the plane of the outer surface of the cylinder 12.

At its upper or inner end the outer cylinder 11 terminates in a peripheral recess or groove 25 in the inner surface thereof. This groove 25 is of such a depth and shape as to receive part of the ball 24 when it is projected beyond the outer surface of the inner cylinder 12. The purpose of this construction is to provide a locking connection between the cylinders 11 and 12 when fully telescoped or retracted. Thus, when the inner cylinder 12 is located in its inward or fully telescoped position relative to the outer cylinder 11, each ball 24 is partially projected outwardly from its hole 23 to engage the groove 25 of the outer cylinder 11 and prevent relative movement of the cylinders 11 and 12.

In order to retain each of the balls 24 in its locking position as described, a reciprocal locking control means 26 is provided within the cylinder assembly 11—12 and carried by the cap 16. This means 26 comprises a collar 27 slideably mounted on the inner end of a stem 28 which is disposed on the longitudinal axis of the inner cylinder 12 and concentric to the cap 16 where it passes through said cap. To this end the cap 16 is pierced by a central aperture 29 surrounded by an inward flange 29' through which the stem 28 passes and where it is sealed by suitable means, such as an O-ring 30.

The collar 27 is generally U-shaped in longitudinal section to provide a channel or cavity 31 for the reception of a compression spring 32 encircling the stem 28, with one of its ends abutting the inner face of the end wall of the cap 16 and its other end abutting the base of the cavity 31 in the channeled collar 27 whereby said collar is constantly urged away from the cap 16 and inwardly of the cylinder assembly 11—12. Movement of the collar 27 inwardly of the cylinder 12 is limited by a washer or stop ring 33 secured to the inner end of the stem 28 by means of a nut 34 to contact the unit 26 at the limit of its inward movement. The outer peripheral face of the collar 27 adjoining the cap 16 is enlarged to provide an outstanding rib 35 at the end thereof adjacent the cap 16 to abut and ride over the inner surface of the cylinder 12 and is disposed to underlie the aligned holes 23 in the cylinder 12 under the normal action of the spring 32. In this manner each of the balls 24 is forced outwardly of its hole 23 to seat part of it in the recess or groove 25 in the inner face of the outer cylinder 11 thereby locking cylinders 11 and 12 against relative movement.

Figure 5:
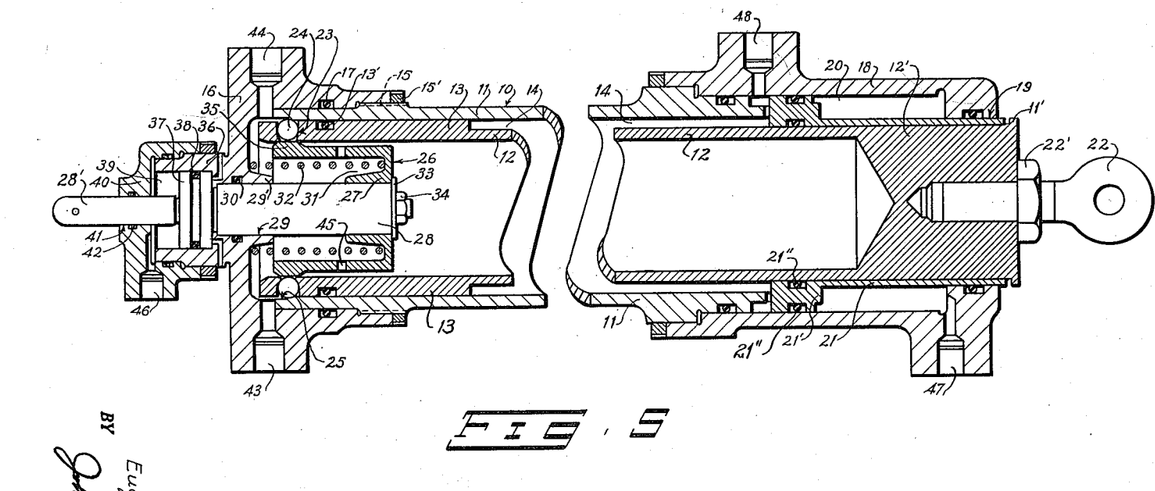
Fig. 5 is a longitudinal section of the power unit of the present mechanism to show the position of its operating parts including the locking means therefor when disposed in the retracted position shown in Fig. 1.

On the outer surface of the cap 16 defining the aperture 29, the cap 16 has an integral extension or neck 36 which surrounds the projecting end of, and is partially coextensive with, the stem 28 to receive and accommodate therein a piston 37 integrally formed on, or attached to, the stem 28. The neck 36 defines a chamber 39 in which the piston 37 reciprocates. This piston 37 has a diameter substantially equal to the internal diameter of the neck 36 and is grooved to receive sealing means, such as an O-ring 38. Being substantially thinner than the length of the neck 36 on cap 16, the piston 37 divides the chamber 39 whereby space is established between the face of the piston 37 and the outer end of the neck 36 when the stem 28 is disposed in its normal position with the piston 37 in approximate abutment with the outer face of the cap 16 within the neck 36 (Fig. 5).

The outer end of the neck 36 on the cap 16 is in turn closed by a secondary cap 40 which is threaded thereto in the same general manner as the cap 16 is secured to the cylinder 11. This cap 40 is pierced by a central aperture 41 for the passage of an extension 28' at the outer end of the stem 28, the coacting surfaces of said secondary cap and said extension stem 28' being appropriately sealed by an O-ring 42.

From the foregoing it will be apparent that reciprocation of the valve stem i.e., stem 28 and its extension 28' out of its normal position, i.e. against the action of the spring 32, serves to compress the spring 32 and move the collar 27 in the direction of the cap 16 whereby the rib or enlargement 35 on the end of said collar is moved out of its normal position underlying the holes 23 in the inner cylinder 12. Each of the balls 24 may then move out of its normal position and inwardly of its hole 23 and out of the groove or recess 25 of the cylinder 11 to unlock or disengage the cylinder 12 from cylinder 11 for unrestricted reciprocation relative thereto.

In order to adapt the above-described power unit assembly 10 for the reciprocation of the cylinder 12 inwardly and outwardly of the aircraft by means of and through air or gas under pressure to the end that the store carried thereby on the eye-bolt 22 may be ejected or jettisoned from the aircraft during flight, the unit 10 is further provided with fittings and fluid lines now to be described. A fluid inlet port 43 pierces the cap 16 for open communication into the inner cylinder 12 at all times and into the channeled collar 27 when said collar is disposed in its normal position. A fluid outlet port 44 also pierces the cap 16 in opposition to the inlet port 43 for similar communication with the cylinder 12 and collar 27. One or more transverse holes 45 are provided in the wall of the collar 27 to permit the free and unrestricted passage of fluid therethrough for communication with the inside of the cylinder 12. The secondary cap 40 is similarly pierced by a combination inlet and outlet port 46 for communication with the chamber 39 within the neck 36 on the cap 16.

At the outer or lower end of the outer cylinder 11 the cap 18 is provided with a fluid inlet port 47 for communication with the chamber 20. In opposition to this inlet port 47 the cap 18 is further provided with a combination inlet and outlet port 48 adjacent its upper or inner end also for communication with the chamber 20.

Referring now more particularly to Figs. 1 to 4 inclusive, a fluid inlet line 49 is connected to each of the ports 43 and 46 at the upper end of the power unit 10 and to the ports 47 and 48 at its lower end. This line 49 terminates at its other end in an appropriate fluid inlet valve 50. This valve 50 may be of standard and conventional construction as is also true of a standard pressure gauge 49' which is operatively associated with the valve 50 to indicate the air or gas pressure in the line 49. A conventional thermo-relief valve 51 may also be provided as a safety measure to vent excessive heat in the line 49 which might otherwise adversely affect the operation of the system.

Interposed in the fluid inlet line 49 between the ports 43 and 46 and between ports 43, 46 and ports 47, 48 is an electrically controlled 5-way valve 52. This valve 52 is organized and arranged to operatively connect the fluid inlet valve 50 with ports 43 and 46 (Fig. 1) or in the alternative to operatively connect the inlet valve 50 with ports 47 and 48 (Figs. 2, 3 and 4), a branch or spur line 53 being operatively disposed between the ports 47 and 48 for the normally constant interconnection thereof.

A fluid vent line 54 terminating in a standard Schrader-type valve 54' with the core thereof removed is connected in any conventional and well-known manner to the valve 52 whereby operation of said valve 52 to connect the inlet valve 50 with ports 47 and 48 serves to simultaneously interconnect port 46 with the vent line 54. The valve or valve stem 54' is, therefore, constantly open for the discharge of fluid in the line 54 to atmosphere. Also interposed in the fluid inlet line 49 between the inlet valve 50 and the 5-way valve 52 is a reservoir or container 55 for the gas or air of the system and if desirable, a conventional filter 56 designed to trap foreign substances which may be introduced in the fluid inlet line 49 at either the inlet valve 50 or container 55.

An electrically controlled 4-way valve 57 is operatively disposed in the spur line 53 between ports 47 and 48. A standard, one-way pressure reducer 58 is connected in the line 53 between the port 47 and the 4-way valve 57. The function of the pressure reducer 58 is to maintain a constant, predetermined pressure of the fluid entering the port 48 from the supply line 49. At the same time the reducer 58 serves to insure that the pressure of the fluid delivered to port 47 will exceed, at all times, that delivered to port 48 for reasons to be explained in the subsequent description of the operation of the power unit 10.

A vent line 61 is operatively connected to the 4-way valve 57 and this vent line terminates in a standard Schrader-type valve 61' comparable, in every respect, to the vent line 54 and valve 54' thereof employed in conjunction with the 5-way valve 52 described above.

A fluid outlet line 62 is also connected to the 4-way valve 57 and terminates at its other end in a connection to the outlet port 44 in the cap 16. A standard restrictor 63 is provided in the outlet line 62 to reduce the rate of flow of fluid leaving the outlet port 44 for reasons which will become apparent upon the subsequent discussion of the operation of the power unit 10.

The 4-way valve 57 is organized and arranged, by any suitable and well-known connections, to work in conjunction with the 5-way valve 52 whereby in one operation it interconnects spur line 53 with the port 48 and simultaneously and concurrently connects the outlet line 62 with the vent line 61 (Figs. 3 and 4) corresponding to the position of valve 52 in operatively connecting inlet line 49 to ports 47 and 48; and in a second operation it closes or cuts off the spur line 53 and simultaneously interconnects the port 48 with the fluid vent line 61 (Figs. 1 and 2) corresponding to the position of valve 52 in operatively connecting inlet line 49 to ports 43 and 46.

In view of the foregoing arrangement, the operation of the power unit assembly 10 by means of and through the fluid pressure system will be described. When the store is suitably connected to the power assembly unit 10 through the eye-bolt 22, the fluid system is filled or charged with air or gas under predetermined pressure through the inlet valve 50. This loading of the system consists in filling the container 55 and the inner cylinder 12 of the power unit through the fluid inlet line 49 and ports 43 and 46. Some of the air or gas thus injected passes out through the outlet port 44 and fills the fluid outlet line 62. At this time the 4-way valve 57 is disposed in a position to connect port 48 with the vent line 61 (Fig. 1) and as the 5-way valve 52 connects the inlet line 49 only to ports 43 and 46 no fluid under pressure is delivered to port 47.

Thus, it is seen (Fig. 5) that the gas or air under pressure delivered to the port 46 and to the space 39 on one side of the piston 37 is equal and opposite to that entering port 43 and operative against the inner ends of the control means 26 and the stem 28. The air or gas under pressure delivered by the port 46 is directed against the outer face of piston 37 while the air or gas under pressure within the cylinder assembly 11—12 is directed against inner ends of the control means 26 and the stem 28. Hence, so long as pressure is available in the chamber 39 from the port 46, plus the action of spring 32, the pressure applied to the ends of the locking control means 26 and the stem 28 will be balanced and there will be no movement of the control means 26 and stem 28 toward the cap 16 to assume the positions shown in Fig. 6 where the balls 24 are released by the rib 35 of said control means. Conversely, if the pressure from port 46 is arrested and this port converted to an escape port (Fig. 2), the air or gas under pressure within the chamber 39 can be exhausted whereupon the pressure of gas or air within the cylinder assembly 11—12 is sufficient to move the locking control means 26 and stem 28 against the action of the spring 32 as well as subsequently project the inner cylinder 12 outwardly of the outer cylinder 11. In short, the pressure from the port 46 is merely a holding pressure designed to maintain the control means 26 and stem 28 in their normal positions as shown in Fig. 5. The normal action of the spring 32, therefore, will dispose the control means 26 with its rib or enlargement 35 to underlie the holes 23 in the cylinder 12 and force the locking balls 24 therein outwardly to engage in the groove 25 of the cylinder 11 and secure the cylinders 11 and 12 against relative movement.

Figure 2:
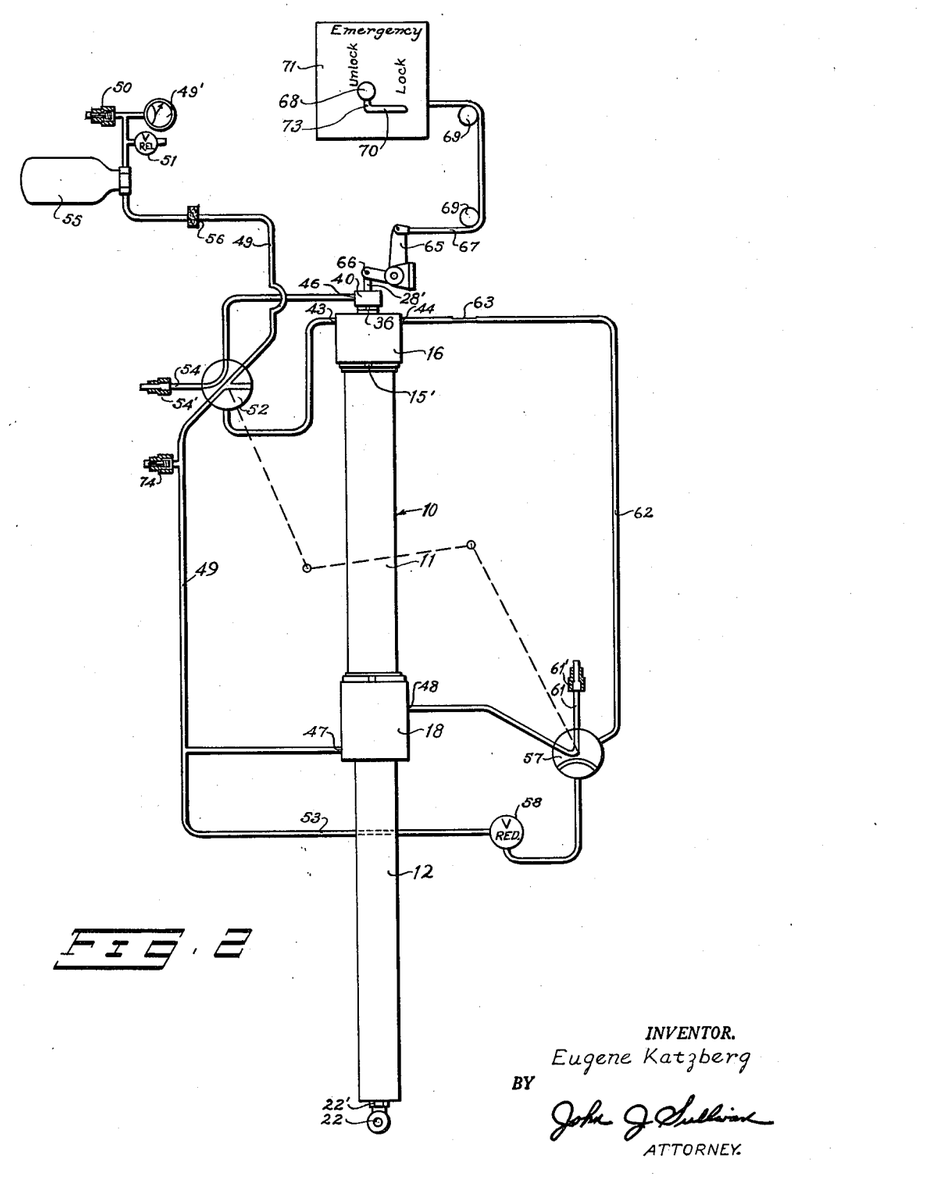
Fig. 2 is a view similar to Fig. 1 to show the protracted position of the device at the approximate time when the associated store is released or disconnected therefrom and immediately prior to the operation of the cushioning or snubbing means.
Figure 6:
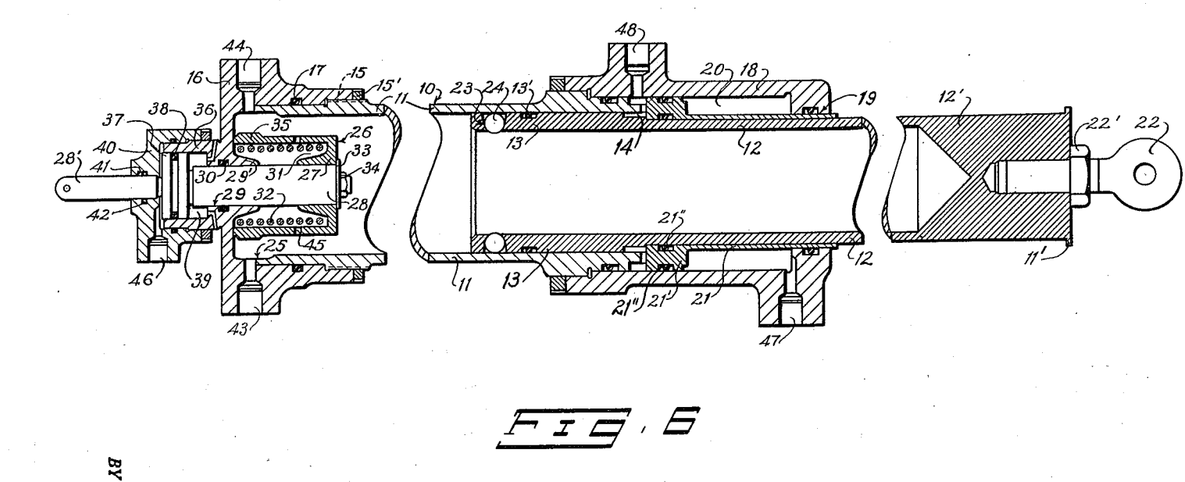
Fig. 6 is a view like Fig. 5 to show the relative position of the operating components of the instant power unit when it is extended or protracted and prior to the operation of the cushioning or snubbing means, all as shown in Fig. 2.

Upon actuation of the 5-way valve 52 by suitable electrical means which per se form no part of this invention, but which are operable from the cockpit of the aircraft, the valve 52 is moved to a position where ports 43 and 46 are disconnected from the fluid inlet line 49 and port 46 is simultaneously connected to the fluid vent line 54 (Fig. 2). At the same time fluid inlet line 49 is connected to the port 47. Upon a venting of the fluid from the space 39 through the vent line 54 with no loss of fluid under pressure at port 43 and in the cylinder 12, control means 26 is forced upward against the normal action of the spring 32 to uncover the holes 23 (Fig. 6). This permits the locking balls 24 to move inwardly of the cylinder 12 out of engagement with the cylinder 11 whereby the cylinder 12 is projected outwardly relative to the outer cylinder 11 under the action of the trapped fluid under pressure within cylinder assembly.

Since fluid under pressure is at this time available at the port 47 and is delivered therethrough to the chamber 20 at the lower end of the power unit 10, this pressure is operative on and against the lower or under surface of the head 21' of the slidable sleeve 21. Thus, as the inner cylinder 12 moves downward in its ejection, its enlargement 13 strikes the upper surface of the head 21' of this sleeve 21 in opposition to the pressurized fluid entering at port 47 and the remainder of the ejecting stroke of said inner cylinder 12 is cushioned or snubbed thereby.

While the connection of the store to the eye-bolt 22 of the power unit 10 per se forms no part of the present invention and is neither disclosed nor described herein, it is contemplated that the disconnection thereof will occur concurrently with the commencement of the snubbing stroke of the inner cylinder 12. In this way the force with which the store is intended and designed to be released, and is in fact released, from the aircraft will in no way be suppressed.

Upon release of the store, however, in any desirable manner, and the total extension of the power unit 10, including the snubbing stroke as described, the 5-way valve 52 has been positioned to interconnect the fluid inlet line 49 and inlet port 47 (Fig. 2). Thus fluid under pressure is also available in the spur line 53 through which it is delivered to the 4-way valve 57. Valve 57 at this time has been positioned to connect port 48 with vent line 61 and the spur line 53 has been closed.

Figure 3:
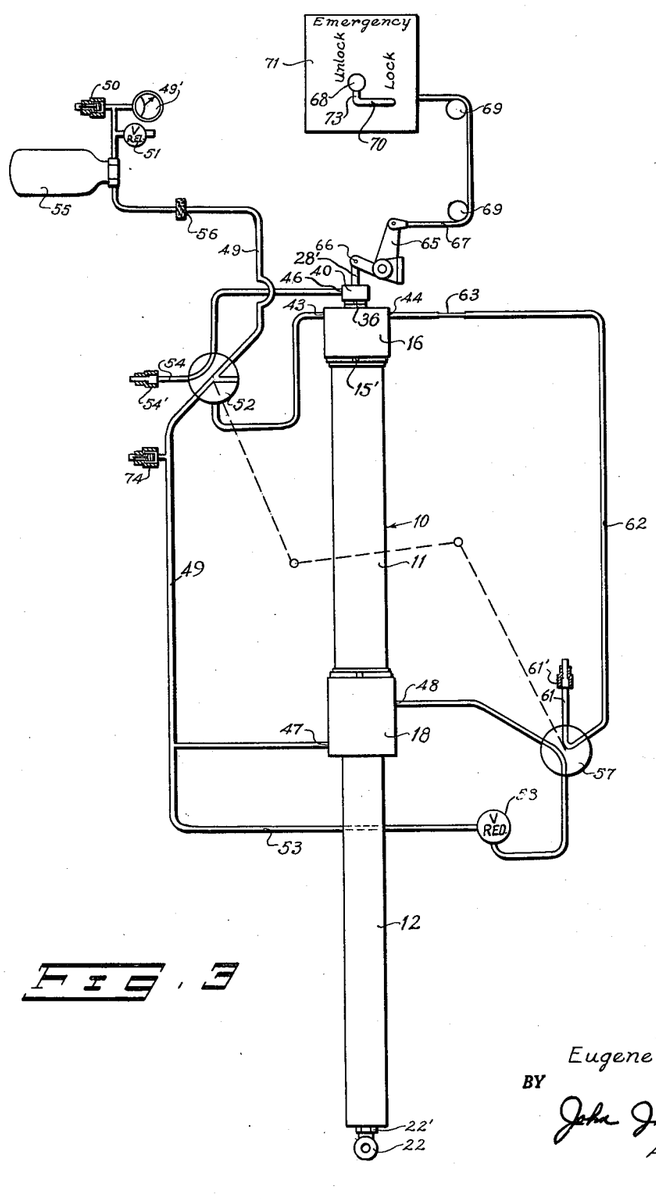
Fig. 3 is a view like Fig. 2 to show the fully protracted or extended position of the device, i.e. its position at the end of the cushioning or snubbing stroke.
Figure 4:
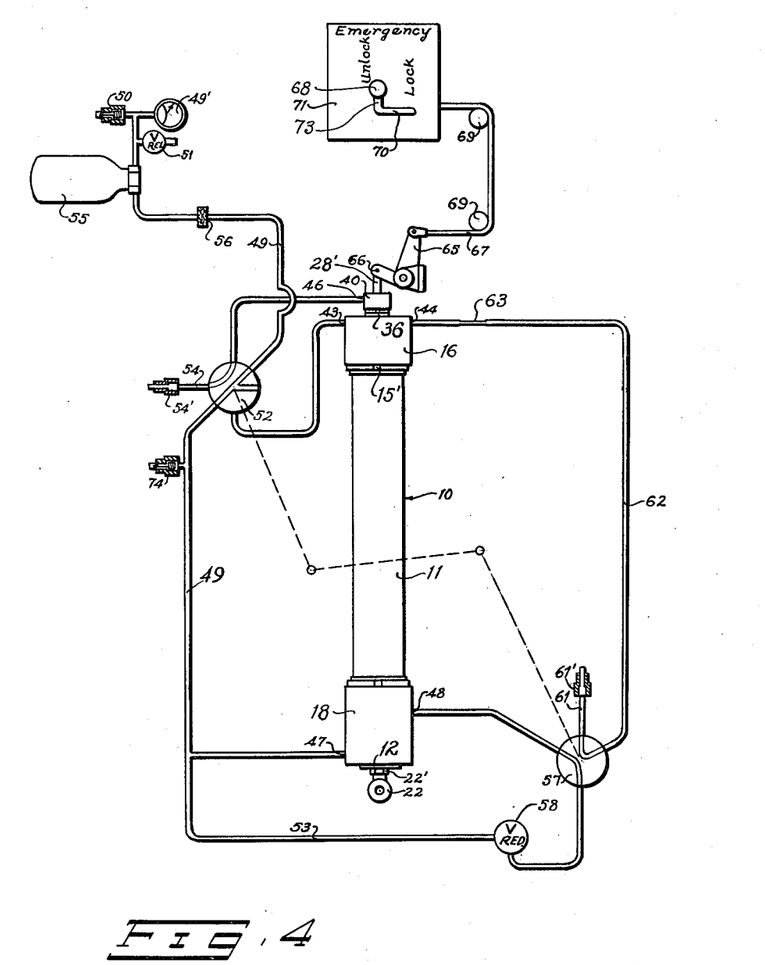
Fig. 4 is a view like Fig. 1 to show the device upon its return to the retracted position but prior to its being locked in this position.

Upon the full ejection operation of the power unit 10, however, the valve 57 is actuated through appropriate means, which per se form no part of the present invention, to connect spur line 53 with port 48 and at the same time connect fluid outlet line 62 with the vent line 61 (Fig. 3). The induction of air or gas under pressure into and through port 48 serves to first act against the upper surface of the head 21' of the sleeve 21 (Fig. 6). However, this is ineffective since any tendency to force said sleeve 21 downwardly or outwardly in the chamber 20 is overcome by the greater pressure operative against the lower surface of the head 21' through port 47 which pressure moves sleeve 21 inwardly of the cap 18 until the head 21' contacts the end of the outer cylinder 11. The continued supply of pressure fluid from port 48 then serves to fill space 14 between the cylinders 11 and 12 and act against the end of the enlargement 13 on the inner cylinder 12 whereby said inner cylinder 12 is raised or forced upwardly or inwardly of the cylinder 11. This additional supply of fluid under pressure originates in and is delivered from the reservoir or container 55 through line 49. The fluid which has been confined in the inner cylinder 12 at this time passes out through the open end thereof, through port 44, outlet line 62 and out through the vent line 61.

During this retracting or telescoping operation of the power unit 10 the function of the pressure reducer 58 interposed in the line 53 between the source 55 and the port 48 is to maintain a constant, predetermined pressure of fluid entering port 48 lest the power unit assembly 10 and/or the operation thereof be impaired. The restrictor 63 in the fluid outlet line 62 adjacent outlet port 44 serves to reduce, in effect, the diameter of the outlet line 62 whereby gas or air which is being exhausted from the inner cylinder 12 is caused to remain momentarily and build up adjacent the cap 16 to provide a cushion or snubbing effect in the upward stroke of the inner cylinder 12.

The foregoing constitutes one cycle in the ejection and retraction operation of the present invention. The invention contemplates the unlimited repetition of this cycle in which the above described system is also employed in order to initiate the next successive cycle. In other words, by means of and through this same system a new store is raised into the aircraft and the operating system and the power unit is reloaded and set for the next successive operation thereof.

Prior to a detailed disclosure of this reloading operation, however, it is necessary to first describe the emergency control mechanism incorporated in, as an integral part of, the subject invention. This emergency mechanism consists generally of means operable from the cockpit of the aircraft and readily controllable by the pilot for manually unlocking the cylinders 11 and 12 in the event of an electrical or fluid pressure failure in the system. To this end appropriate linkage is provided which may, for example, consist of a bellcrank lever 65 one arm of which is pivotally connected to the outer end of the extension 28' of the stem 28, as at 66, and a cable 67 operatively connected to the other arm of the bellcrank 65. At its other end the cable 67 is attached to a control handle 68 located in the cockpit of the aircraft. Between the handle 68 and the pivotal connection 66 the cable may be passed over a number of rollers or pulleys 69 as may be appropriate to facilitate the reciprocation thereof.

The control handle 68 is mounted for unrestricted movement in a longitudinal slot 70 in a panel 71 which is fixedly secured at some convenient place in the cockpit. When the handle is disposed in its normal position at one end of the slot 70 under the force of the spring 32 acting on and against the locking control means 26 and the stem 28 and through the cable 67 the emergency mechanism is disposed in the "locked" position, i.e. cylinders 11 and 12 are locked against relative movement. At its other extremity the slot 70 is intersected by a lateral holding slot 73 in which the handle may be located to lock it in a position where a force in opposition to the spring 32 is being applied on the stem 28 through the cable 67 and bellcrank 65. This corresponds to the "unlocked" condition of the cylinders 11 and 12 to permit relative movement.

In view of the foregoing, it is seen that upon either an electrical or fluid pressure failure in the system it is possible, by means of and through the emergency mechanism just described, to manually reciprocate the stem 28 against the normal action of the spring 32. When the stem 28 is thus reciprocated the rib 35 of the means 26 is concurrently moved out of alignment with the holes 23, permitting the locking balls 24 to move out of engagement with the groove 25 of the outer cylinder 11 and the simultaneous projection or extension of the cylinder 12 relative to cylinder 11 by the force of the gas or air under pressure trapped in the power unit 10. Of course, when no fluid is trapped in the power unit 10, i.e. the unit is uncharged, the force of gravity alone will cause the inner cylinder 12 to drop or move to its protracted position.

The details of construction of the foregoing emergency mechanism per se form no part of the instant invention and can be varied to include any and all conventional mechanisms by which the same result may be obtained. One such mechanism, by way of example, may consist of a power device to actually move bellcrank lever 65 appropriately for disconnecting or unlocking the cylinders 11 and 12 where it is impossible or improbable that a pilot may exert sufficient force thereon through simple mechanical linkage such as that just described. So far as the invention is concerned, any suitable means is contemplated whereby the stem 28 may be reciprocated to unlock the power unit assembly 10 in case of an electrical or fluid pressure failure in the system.

It may also be desirable to include a mechanical or hydraulic override mechanism for the operation of either or both of the valves 52 and 57 in the event that an electric failure alone might occur. Any one of countless existing devices may be employed to this end the details of construction of which form no part of the invention save that such an emergency override system is contemplated in order to render the present power unit assembly and operating system foolproof.

When it is desired to reload the power assembly 10 and operating system therefor for a subsequent cycle following the jettison or ejection of the store as hereinabove described, charged gas or air which may remain in the system is first bled or exhausted. This is effected by opening the inlet valve 50 to exhaust fluid in the various lines which connect to the ports 43 and 46 of the power unit 10. A second vent valve 74 is incorporated in the line 49 between the 5-way valve 52 and inlet port 47. This valve is also opened at this time to insure the total removal of fluid from that portion of the line 49 connected to the bottom of the power unit assembly 10 as well as line 53.

With the entire system bled or drained and the emergency mechanism disposed in the "unlocked" position whereby the cylinders 11 and 12 are free to move relative to each other (Figs. 2, 3 and 4) the inner cylinder 12 will drop by gravity to its fully extended position permitting the bomb or store to be attached to the outer end 22 thereof. The pilot's emergency control handle 68 is now moved to the "locked" position to place the stem 28 under the normal action of the spring 32. Gas or air under pressure is now injected into the system from a suitable outside source through the valve 74, which is at this time operatively connected to the lower end of the power unit 10 through the port 47. When the chamber 20 has been completely pressurized and the sleeve 21 has been fully retracted, the valve 74 is closed. Gas or air under a lesser pressure from the outside source is now injected through the port 48 from the valve 61' a valve core having been first operatively installed therein. Thus, the pressurized fluid entering port 48 is forced into the space 14 between the inner and outer cylinders 11 and 12, and acts on the lower face of the enlargement 13 on the upper end of the inner cylinder 12 thereby forcing said cylinder 12 upward telescopically in the outer cylinder 11. The upper face of the head 21' of collar 21 serves as a fixed support or back-up plate during this retracting operation of the inner cylinder 12 in the outer cylinder 11.

As the inner cylinder 12 approaches its upward limit in the outer cylinder 11, the locking ball or balls 24 carried thereby ride over and against the outer face of the enlargement 35 on collar 27 whereby each ball 24 moves outwardly in its respective hole 23 for ultimate reception in the recess or groove 25 in the upper extremity of the outer cylinder 11. Thus the cylinders 11 and 12 are locked one with the other against further relative movement.

Figure 1:
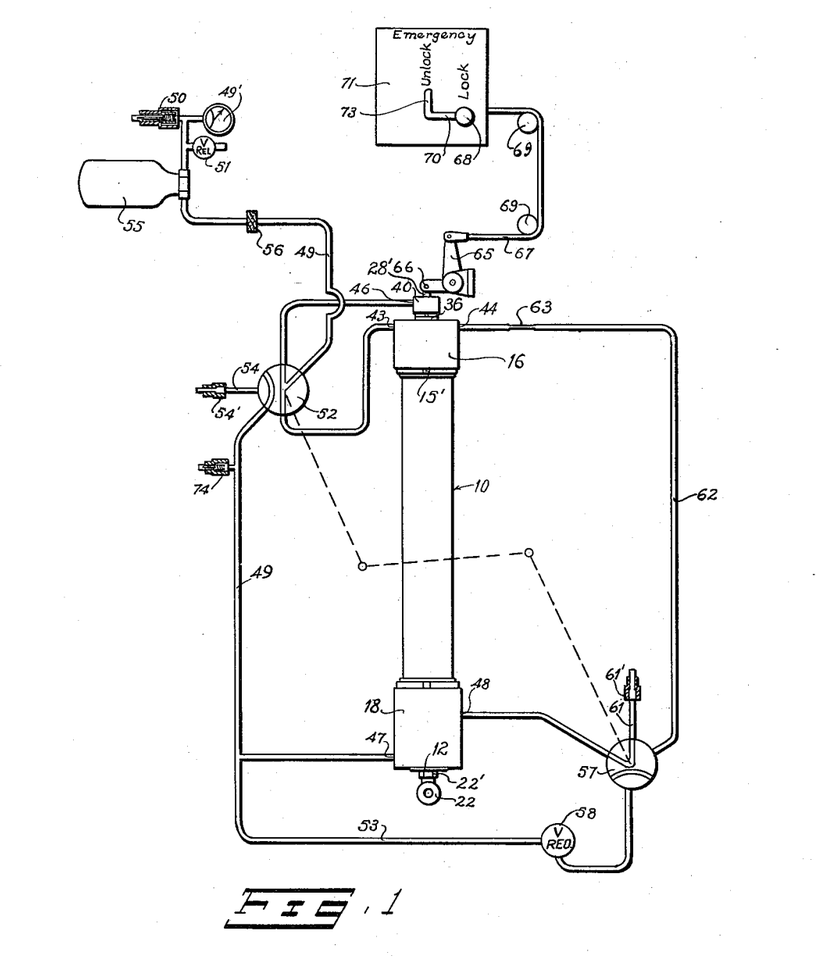
Fig. 1 is a schematic view of the present power loading and ejection mechanism disposed and locked in the retracted position and the operating system by which it is protracted or extended and may be subsequently retracted again.

When the power unit 10 has been fully retracted or telescoped and locked in this position as just described, the valves 61' and 74 are opened to vent the excess fluid remaining in the lines connected to the lower end of the power unit 10. When the lower end of the power unit has thus been bled, the valve 74 is closed and an outside source or ground supply of pressurized fluid is now operatively connected to the inlet valve 50. The system is now reloaded or recharged with air or gas under pressure as described herein (Fig. 1). As hereinabove described, this loading of the fluid system serves to concurrently fill or load the inner cylinder 12, chamber 39 located within neck 36 and the reservoir or container 55. Upon removal of the connection of valve 50 with the ground source or outside fluid supply, valve 50 is closed and the power unit is ready for its sequential ejection, snubbing and retracting operation as described.

It is to be understood that the loading and/or reloading of the power unit 10 as well as the entire fluid system may be effected from an outside source carried within the airplane itself as well as a ground source to the end that repeated operation of the power unit is possible during a single flight. In this case the reservoir or container 55 hereinabove described may be omitted and replaced by direct connections of the inlet line 49 to the source whereby the necessary fluid is supplied for the retracting operation in the same manner as described.

What is claimed is:

1. In a stores loading and ejection mechanism for aircraft the combination with a cylinder assembly comprising a stationary cylinder attached to the aircraft structure and a movable cylinder mounted for reciprocation in and extending outwardly from one end of the stationary cylinder and adapted to carry and support a store at its outer end, of locking means mounted within the cylinders for securing them against relative movement when fully telescoped, a fluid pressure system associated with the cylinder assembly including means to charge said assembly with fluid under pressure when the cylinders are fully telescoped and there locked against relative movement, control means for releasing the lock between the cylinders to project the movable cylinder outwardly with reference to the stationary cylinder under the action of the fluid trapped within the assembly, and arresting means in the fluid pressure system concurrently operative with said control means, said means including supplemental fluid under pressure operable on and against the movable cylinder in opposition to the action of the trapped fluid to resist the outward projection of the movable cylinder at a predetermined point in its travel.

2. In a stores loading and ejection mechanism for aircraft the combination with a cylinder assembly comprising a stationary cylinder attached to the aircraft structure and a movable cylinder mounted for reciprocation in and extending outwardly from one end of the stationary cylinder and adapted to carry and support a store at its outer end, of locking means disposed between the cylinders for securing them against relative movement when fully telescoped, a fluid pressure system operatively connected to the cylinder assembly including means to charge said assembly with fluid under pressure when the cylinders are fully telescoped and there locked against relative movement, control means for releasing the lock between the cylinders to thereby project the movable cylinder outwardly with reference to the stationary cylinder under the action of the fluid under pressure within the assembly, and means in the fluid pressure system to establish a fluid cushion operative on and against the movable cylinder in opposition to the action of the trapped fluid to thereby snub the outward projection of the movable cylinder when it approaches the outer limit of its movement, said means being adjustable to subsequently vent the trapped fluid from the assembly and deliver supplemental fluid under pressure to the cylinder assembly for returning the movable cylinder to its fully telescoped position in the stationary cylinder.

3. A stores loading and ejection mechanism for aircraft comprising in combination an outer cylinder immovably secured to the aircraft, an inner cylinder disposed for reciprocation within said outer cylinder and terminating at its outer end beyond the end of the outer cylinder, means for attaching a store to the outer end of the inner cylinder, said cylinders being closed at opposed ends, fluid inlet means associated with said cylinders whereby the inner cylinder alone is normally charged with fluid under pressure, a fluid pressure lock interposed between said cylinders and operative by said fluid inlet means to secure said cylinders against relative movement when fully telescoped, a control for said lock to vent the fluid under pressure acting thereon to disconnect the cylinders whereby the inner cylinder is moved outwardly of the outer cylinder by the pressurized fluid therein, a snubber effective concurrently with the operation of said control to gradually arrest the outward movement of the inner cylinder adjacent the end of its path of movement, and selective means operable with the operation of said snubber for the delivery of supplemental fluid to said snubber for operation thereon in opposition to its arresting action aforesaid whereby the inner cylinder is moved inwardly of the outer cylinder to its fully telescoped position therein.

4. A stores loading and ejection mechanism for aircraft comprising a power unit having an outer cylinder immovably secured to the aircraft and an inner cylinder mounted for reciprocation in said outer cylinder, said cylinders being closed at their opposed ends and the inner cylinder being provided at its outer closed end with means for attaching a store thereto, in combination with a fluid supply means to selectively charge said power unit with fluid under pressure for the protraction or retraction of the inner cylinder relative to the outer cylinder, a fluid pressure lock normally operative to secure said inner cylinder in its fully retracted position in opposition to the pressure of the fluid within the power unit, a lock control to vent fluid pressure acting on said lock whereby the pressurized fluid within the unit disengages the lock for the disconnection of the inner cylinder from the outer cylinder and spontaneous projection thereof outwardly of the outer cylinder, and means responsive to the operation of said lock control to snub the movement of the inner cylinder outwardly of the outer cylinder and gradually arrest such outward movement adjacent the outer end of said outer cylinder.

5. A stores loading and ejection mechanism for aircraft comprising a power unit consisting of an outer cylinder fixedly secured to the aircraft and an inner cylinder mounted for reciprocation in the outer cylinder, said cylinders being closed at opposed ends and the inner cylinder having means at its closed outer end for the engagement and support of a store, in combination with a supply of fluid under pressure connected to said power unit whereby either one of the cylinders may be selectively charged with fluid under pressure for either the protraction or retraction of the inner cylinder relative to the outer cylinder, a fluid pressure lock normally operative to secure the inner cylinder in its fully retracted position within the outer cylinder in opposition to the fluid pressure in the inner cylinder, a selective lock control to vent the fluid pressure on the lock and thereby disconnect the inner cylinder from the outer cylinder for the protraction of said inner cylinder by the fluid pressure in the inner cylinder, snubbing means operative upon the actuation of said lock control to engage the inner cylinder and gradually arrest its movement outwardly of the outer cylinder adjoining the outer end of the latter, and cushioning means operable simultaneously and concurrently with the retraction of the inner cylinder to control its speed and force in retraction.

6. A stores loading and ejection mechanism for aircraft comprising a power unit consisting of a pair of telescoping cylinders one of said cylinders being secured to the aircraft and the other cylinder extending outwardly from the first cylinder and being adapted to be connected to a store and a closure at one end of each cylinder, in combination with means for charging the inner cylinder with fluid under pressure, locking means disposed between said cylinders to secure the inner cylinder fully telescoped within the outer cylinder against the fluid pressure in the inner cylinder, a selective control to release said locking means to thereby permit the fluid under pressure within the inner cylinder to operate against and between the closures aforesaid to move the inner cylinder outwardly of the outer cylinder, stop means to limit the outward travel of the inner cylinder, shock-absorbing means within the closure of the outer cylinder automatically operative upon the operation of said control on and against the inner cylinder in opposition to the fluid pressure aforesaid to thereby coact with said stop to snub the movement of the inner cylinder, a reservoir for fluid under pressure, a normally inoperative connection between said reservoir and the outer cylinder whereby pressurized fluid from said reservoir may be delivered to said outer cylinder to move the inner cylinder inwardly of the outer cylinder at a predetermined rate, and selective means for rendering said normally inoperative connection operative for the retraction of the inner cylinder.

7. A stores loading and ejection mechanism for aircraft comprising a power unit consisting of a pair of cylinders, one fixedly secured to the aircraft and the other mounted for reciprocation relative thereto, both cylinders terminating in a closure at one of their ends whereby said closures are disposed in spaced opposition to each other, in combination with a fluid inlet to charge said cylinders with fluid under pressure to be trapped between said closures, a lock within the cylinders and adapted to secure the reciprocable cylinder against movement relative to the fixed cylinder when said cylinders are fully telescoped one within the other, said lock being positioned to respond to the pressure of the fluid trapped as aforesaid within the cylinders, and independent, selective means to permit the pressure of the trapped fluid to operate said lock to release the reciprocable cylinder and allow the pressure of the trapped fluid to project it outwardly relative to the fixed cylinder.

8. A stores loading and ejection mechanism for aircraft comprising a power unit consisting of a pair of cylinders, one fixedly secured to the aircraft and the other mounted for reciprocation relative thereto, and a closure for one end of each cylinder said closures being disposed in spaced opposition to each other at opposed ends of said cylinders, in combination with a fluid inlet to charge said cylinders with fluid under pressure to be trapped between said closures, locking means interposed between said cylinders operable to secure the reciprocable cylinder against movement relative to the fixed cylinder when said cylinders are fully telescoped, a lock control carried by the fixed cylinder including operating means normally acting to always position the control for the engagement of the lock, fluid pressure holding means associated with said lock control to combine with the operating means to hold the lock control in its operative position against the pressure of the fluid trapped within said cylinders and thereby maintain the cylinders against relative movement, and means for rendering said holding means ineffective allowing the trapped fluid to adjust said control against the action of said operating means and thereby release said lock and simultaneously project the reciprocable cylinder outwardly of the fixed cylinder.

9. A stores loading and ejection mechanism for aircraft comprising a power unit consisting of an outer cylinder immovably secured within the aircraft, said cylinder being open at its outer end and closed at its inner end, an inner cylinder mounted for reciprocation in said outer cylinder and having its outer end closed and a connector attached to the closed end of the inner cylinder to engage and support a store, in combination with an air inlet assembly so connected to the cylinders that the inner cylinder may be charged with air under high pressure disposed between the closed ends of said cylinders, a lock interposed between said cylinders normally operative to secure said cylinders one to the other against the pressure of the air within the inner cylinder, said lock including means to maintain it in such position by independent air pressure, a selector valve associated with the air inlet assembly adjustable to a position for charging the inner cylinder as aforesaid and to another position for venting the air pressure maintaining said lock in its normally operative position whereupon the lock releases the inner cylinder for projection from the open end of the outer cylinder by pressure of the air in the inner cylinder operating between the closed ends of both cylinders, a source of air under pressure normally closed by said selector valve, a second air inlet assembly connected to said source of air under pressure through the selector valve and to the outer end of the outer cylinder only, the adjustment of the selector valve to its position for venting the air pressure from the lock also connecting the source of air under pressure to the second inlet assembly to retract the inner cylinder into the outer cylinder, and means for venting the air within the inner cylinder as it is retracted into the outer cylinder.

10. A power mechanism for the loading in or the displacement of a store outwardly of an aircraft comprising a pair of hollow telescoping members, a lock between said members to secure them one to the other in the retracted position, a fluid system normally operative concurrently against said lock to maintain it in operative position and against the telescoping members always tending to cause the extension of one member relative to the other member, a control valve for said system to render the lock inoperative whereby one member moves relative to the other under the pressure of fluid from the system, a snubber effective upon the operation of said valve to cushion the force of the movement of said member adjacent the end of said movement, and a second control valve for the operation of said fluid system to effect the return of said member movable to its original, telescoped position at a predetermined rate.

11. The combination with a power mechanism for the displacement of a store outwardly of an aircraft including a pair of hollow members organized and arranged for relative telescoping movement and a lock to secure said members against movement when telescoped, of a fluid pressure operating system for the protraction and retraction of one of said members relative to the other comprising an inlet assembly for the delivery of fluid under pressure into one of said members to effect its protraction upon the release of said lock, fluid pressure means for maintaining said lock in its operative position securing said members against relative movement when telescoped, a vent means associated with the fluid pressure means of said lock, a selective valve for opening said vent to atmosphere for the release of said lock, a source of fluid under pressure, a fluid snubber supplied from said source and controlled by said valve to be operable concurrently with said vent means to arrest the outward movement of the movable member, and a valve assembly operable upon the operation of said selective valve to vent the air under pressure from said members and concurrently connect said source of fluid to said members for the retraction of the movable member.

12. The combination with a power mechanism for the displacement of a store outwardly of an aircraft including a pair of hollow telescoping members, one stationary and the other to be projected relative thereto and a lock to secure said members against relative movement when fully telescoped, of an operating system for the projection of one of said members relative to the other comprising a normally operative inlet assembly to deliver and confine air under pressure in the member to be projected, a source of air under pressure, a normally inoperative inlet assembly for the delivery of air from said source into the stationary member, an air pressure means associated with said lock normally operative to maintain it in position to secure said members against relative movement and against the pressure of air in the projectable member, a normally inoperative vent for said air pressure means, a selective valve to simultaneously and concurrently render the normally operative inlet assembly inoperative and the vent operative to thereby release the lock, and a second selective valve operable upon the operation of said first valve to render the normally inoperative inlet assembly operative for the retraction of the movable member to its normal position telescoped within the stationary member.

13. A stores loading and ejection mechanism for aircraft comprising a power unit having an outer cylinder immovably secured to the aircraft and an inner cylinder mounted for reciprocation in said outer cylinder, said cylinders being closed at opposed ends and the inner cylinder being provided at its outer closed end with means for connecting a store thereto, in combination with fluid supply means connected to the inner cylinder for charging it with fluid under pressure, a fluid pressure lock between said cylinders and operative to normally secure one to the other in the fully telescoped position of the inner cylinder, a selective control operable to vent the fluid under pressure acting on said lock and thereby disconnect the cylinders whereby the inner cylinder is projected outwardly of the outer cylinder by the pressurized fluid therein acting between the closed ends of the cylinders, snubbing means effective upon the operation of said control to engage the inner cylinder and gradually arrest its projection from the outer cylinder adjacent the open end of the latter, a normally inoperative secondary fluid supply means connected to said inner cylinder in opposition to the first fluid supply means for the delivery of fluid under pressure thereto, and selective means for operatively connecting said secondary supply means and simultaneously venting said first fluid supply means whereby the inner cylinder is returned to its normal retracted position within the outer cylinder.

14. A stores loading and ejection mechanism for aircraft comprising a power unit consisting of an outer cylinder fixedly secured to the aircraft and an inner cylinder mounted for reciprocation relative thereto and a closure for one end of each cylinder, said closures being disposed in spaced opposition to each other at opposed ends of said cylinders, in combination with a primary inlet to charge said cylinders with air under pressure to be trapped between said closures, a plurality of balls carried by the inner cylinder and freely movable to and from extreme positions where each ball projects either inwardly or outwardly of said cylinder, means carried by the outer cylinder to receive the balls when projected outwardly of the inner cylinder, a control carried by the outer cylinder and projecting internally of the inner cylinder, resilient means operative against said control to normally move it into abutment with the surfaces of all of said balls and simultaneously force them outwardly of said inner cylinder into engagement with the outer cylinder thereby locking the inner and outer cylinders against relative movement when fully telescoped and against the pressure of the air therein, a holding device operable by air pressure and cooperating with said control to supplement the normal action of the resilient means and hold said control in contact with the balls and against the pressure of the air in the cylinders to maintain the balls projecting outwardly of the inner cylinder and in engagement with the outer cylinder, means for relieving the air pressure operating the holding device to render it ineffective thereby permitting the air under pressure in the cylinders to move the control against the action of the resilient means whereby the balls disengage the outer cylinder and the inner cylinder is projected outwardly of the outer cylinder, a second inlet associated with said cylinders to establish an air cushion therein operable against the inner cylinder concurrently with the operation of the holding device as aforesaid to gradually arrest the movement of said inner cylinder as it approaches the end of its movement outwardly of the outer cylinder, a third air inlet connected to said cylinders, a source of air under pressure connected to said third inlet, and a valve disposed between said third inlet and said source of air under pressure to supply pressurized air to act on and against the inner cylinder and thereby effect the retraction thereof inwardly of the outer cylinder.

References Cited in the file of this patent

UNITED STATES PATENTS

| | | |
|---|---|---|
| 899,795 | Osmer | Sept. 29, 1908 |
| 1,537,437 | Graffinberger | May 12, 1925 |
| 1,989,387 | Vickers | Jan. 29, 1935 |
| 2,163,982 | Mercier | June 27, 1939 |
| 2,241,184 | Clark | May 6, 1941 |
| 2,266,867 | Hume | Dec. 23, 1941 |
| 2,349,244 | Brown | May 23, 1944 |
| 2,474,235 | Dresser | June 28, 1949 |
| 2,475,723 | Sanford | July 12, 1949 |
| 2,548,439 | Moffett | Apr. 10, 1951 |
| 2,612,951 | Palmleaf | Oct. 7, 1952 |
| 2,650,572 | Amstutz | Sept. 1, 1953 |
| 2,720,864 | Smith | Oct. 18, 1955 |

FOREIGN PATENTS

| | | |
|---|---|---|
| 764,509 | France | Mar. 5, 1934 |
| 50,477 | France | Jan. 15, 1939 |
| (Addition to No. 856,075) | | |
| 909,725 | France | Jan. 7, 1947 |
| 341,511 | Italy | June 27, 1936 |
| 493,652 | Great Britain | Oct. 12, 1938 |